US012611798B2

(12) United States Patent
Vaccari et al.

(10) Patent No.: US 12,611,798 B2
(45) Date of Patent: Apr. 28, 2026

(54) MACHINE FOR DRY DECORATION OF CERAMIC TILES, WITH A CONTROL SYSTEM FOR A CERAMIC MIXTURE ACCUMULATION

(71) Applicant: SYSTEM CERAMICS S.P.A., Fiorano Modenese (IT)

(72) Inventors: Paolo Vaccari, Modena (IT); Ivan Ghirelli, Castellarano (IT); Franco Gozzi, Formigine (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 523 days.

(21) Appl. No.: 17/999,512

(22) PCT Filed: May 21, 2021

(86) PCT No.: PCT/IB2021/054435
§ 371 (c)(1),
(2) Date: Nov. 21, 2022

(87) PCT Pub. No.: WO2021/255548
PCT Pub. Date: Dec. 23, 2021

(65) Prior Publication Data

US 2023/0234259 A1 Jul. 27, 2023

(30) Foreign Application Priority Data

Jun. 19, 2020 (IT) ........................ 102020000014812

(51) Int. Cl.
*B28B 13/02* (2006.01)
*B28B 1/00* (2006.01)
(Continued)

(52) U.S. Cl.
CPC ............ *B28B 13/022* (2013.01); *B28B 1/005* (2013.01); *B28B 5/027* (2013.01); *B28B 13/021* (2013.01); *B28B 17/0081* (2013.01)

(58) Field of Classification Search
CPC .................................................... B28B 13/022
See application file for complete search history.

(56) References Cited

U.S. PATENT DOCUMENTS 4,974,646 A * 12/1990 Martin .................. B65D 90/54
406/84
5,088,592 A * 2/1992 Palmers ................. B29C 43/34
414/331.14
(Continued)

FOREIGN PATENT DOCUMENTS

CN 108225507 A 6/2018
CN 109986689 A 7/2019
(Continued)

OTHER PUBLICATIONS

English machine translation of CN 109986689, retrieved from USPTO database May 21, 2025 (Year: 2025).*

*Primary Examiner* — Timothy Kennedy
(74) *Attorney, Agent, or Firm* — Chrisman Gallo Tochtrop LLC

(57) ABSTRACT

A machine for dry decoration of ceramic slabs or tiles, comprising: —a deposit plane (50); —a distributor unit (D), arranged to dispense, in a controlled manner, a ceramic compound in granular or powdered form, formed by two or more different ceramic materials; —a storage container (F), interposed between the distributor unit (D) and the deposit plane (50) to store a certain quantity of ceramic compound dispensed by the distributor unit (D), and comprising an unloading opening (O) arranged to allow the deposit of the ceramic compound on the deposit plane (50); wherein the storage container (F) and the deposit plane (50) are in
(Continued)

relative movement with respect to one another along a longitudinal direction (Y); —a control module, connected to the distributor unit (D) and arranged to control and regulate the dispensing of ceramic compound by the distributor unit (D); The machine comprises one or more sensors (S), connected to the control module and arranged to detect a significant parameter of the quantity of ceramic compound contained in the storage container (F) and to process a corresponding measurement signal; The control module is arranged to regulate the dispensing of ceramic compound as a function of the measurement signal received, so as to maintain a desired amount of ceramic compound inside the container (F).

14 Claims, 10 Drawing Sheets

(51) Int. Cl.
*B28B 5/02* (2006.01)
*B28B 17/00* (2006.01)

(56) References Cited

U.S. PATENT DOCUMENTS 5,598,876 A * 2/1997 Zanini .................... B65B 1/16 141/93
8,333,916 B2 * 12/2012 Jamrussamee ........ B28B 13/026 425/134
9,174,392 B2 * 11/2015 Hartmann ............... B29C 31/02
9,186,819 B1 * 11/2015 Grzeskowiak, II ..... B29C 31/10
9,289,923 B1 * 3/2016 Grzeskowiak, II ..... C04B 41/60
2002/0160108 A1 * 10/2002 Aschenbeck ............. E04D 1/26 118/201
2005/0213429 A1 * 9/2005 Izzo ........................ B28B 13/02 366/349
2018/0250846 A1 * 9/2018 Stefani .................... B28B 5/021
2020/0039108 A1 2/2020 Scardovi et al.
2021/0268686 A1 * 9/2021 Tarozzi ................... B28B 1/005
2021/0379794 A1 12/2021 Vaccari et al.
2022/0111413 A1 * 4/2022 Ghirelli ..................... B05C 9/06
2022/0323988 A1 * 10/2022 Ghirelli ............... B28B 13/0215

FOREIGN PATENT DOCUMENTS

EP 0605930 A1 * 7/1994 ........... B28B 13/022
EP 1175984 A2 * 1/2002 ........... B28B 13/022
EP 1717000 A1 * 11/2006 ......... B28B 13/0245
EP 2487469 A1 8/2012
EP 2065150 B1 3/2014
WO WO-0172489 A2 * 10/2001 ........... B05B 7/1495
WO WO-2004087392 A2 * 10/2004 ........... B29C 70/088
WO 2020058891 A1 3/2020
WO 2020121098 A1 6/2020

* cited by examiner

MACHINE FOR DRY DECORATION OF CERAMIC TILES, WITH A CONTROL SYSTEM FOR A CERAMIC MIXTURE ACCUMULATION

The invention relates particularly, but not exclusively, to the decorating machine described in PCT/IB2019/060214, the contents of which are intended as integrally incorporated in the following description.

The present invention relates to a decorating machine, for dry decoration of ceramic tiles.

A decorating machine is described in the above-mentioned publication, conceived by the same applicant, which comprises a support element, provided with a plurality of pre-established shaped cavities, for example in the form of substantially straight grooves. The support element is defined, for example, by a flexible belt, closed in a loop around a closed path. The machine further comprises a dispensing device, arranged to deposit a predetermined quantity of product inside one or more predetermined cavities. The dispensing device includes depositing two or more granular ceramic materials with different features, for example by colour or grain size, in a controlled manner, inside selected cavities, so as to reproduce a decoration inside and on the surface of a layer of ceramic material.

An unloading device is arranged to move the cavities from a loading position, in which they can receive the powdered material from the dispensing device to an unloading position, in which they can unload the powdered material. The unloading device is substantially defined by one or more motorised rollers which slide the support element. Along the path defined by the rollers the support element has an upper section, along which it slides advancing along the longitudinal direction and along which the cavities are facing upwards, in the loading position, and a lower section, along which the cavities are facing downwards. In the passage from the loading position to the unloading position, the cavities pass from a position in which they are facing upwards to a position in which they are facing downwards. During such a passage, each cavity pours the contents thereof downwards, on an underlying deposit plane. Between the support element carrying the cavities and the underlying deposit plane, a relative motion is envisaged, so that the material descending from the cavities deposits and forms a continuous layer which comprises the decorations made by means of the dispensing device. The layer deposited on the deposit plane is intended to undergo the pressing which precedes the firing of the ceramic tile or slab.

To favour the maintenance of the structure of the decoration, it is possible to provide a containment barrier, arranged and shaped so as to intercept the material which is unloaded from the cavities, to guide or divert the trajectory thereof in a predetermined manner. In a particularly effective embodiment, such a barrier comprises a pair of walls placed side by side so as to define a collection space.

A first wall is situated near the first roller, i.e., near the area in which the unloading of the cavities occurs. The first wall is arranged and shaped so as to intercept the material which is unloaded from the cavities, to guide or switch the trajectory thereof inside the collection space. The second wall is situated upstream of the first wall with respect to the advancement direction of the cavities. The second wall is situated so as not to interfere with the material which is projected forward by the cavities, but rather to contain the material, intercepted by the first wall, which falls downwards. In essence, the two walls define a hopper which collects the material coming from the cavities and deposits it on the deposit plane.

The material accumulated inside the collection space is progressively deposited on the deposit plane and is dragged in advancement by the latter. By accumulating inside the collection space and, progressively, unloading onto the deposit plane, the material maintains the decoration made with the dispensing device.

The relative speed between the deposit plane and the support element is regulated so that the quantity of material accumulated in the collection space remains substantially constant. This allows to control the structure of the decoration with great precision, and to transfer the decoration with the expected configuration and definition on the deposit plane. For example, the relative speed is regulated so that the height of the material inside the collection space remains substantially constant. In addition to the advantages indicated above, maintaining the height constant allows to reduce the jump of the material from the support element downwards.

In some cases, to maintain a constant quantity of material inside the storage space, it is not sufficient to control the relative speed between the support element and the deposit plane. In particular, in cases where the ceramic material has a non-constant grain size, or in cases where two or more ceramic materials of very different grain size are used, significant fluctuations in the quantity of accumulated material may occur. Such fluctuations may impair the quality of the layer deposited on the deposit plane.

An object of the present invention is to overcome the drawbacks described above.

The main advantage offered by the decorating machine according to the present invention is to maintain a constant quantity of material inside the storage space, even in the presence of one or more ceramic materials with not constant or different grain sizes.

Additional features and advantages of the present invention will become more apparent from the following detailed description of an embodiment of the invention, illustrated by way of non-limiting example in the appended figures in which.

Figure 11:
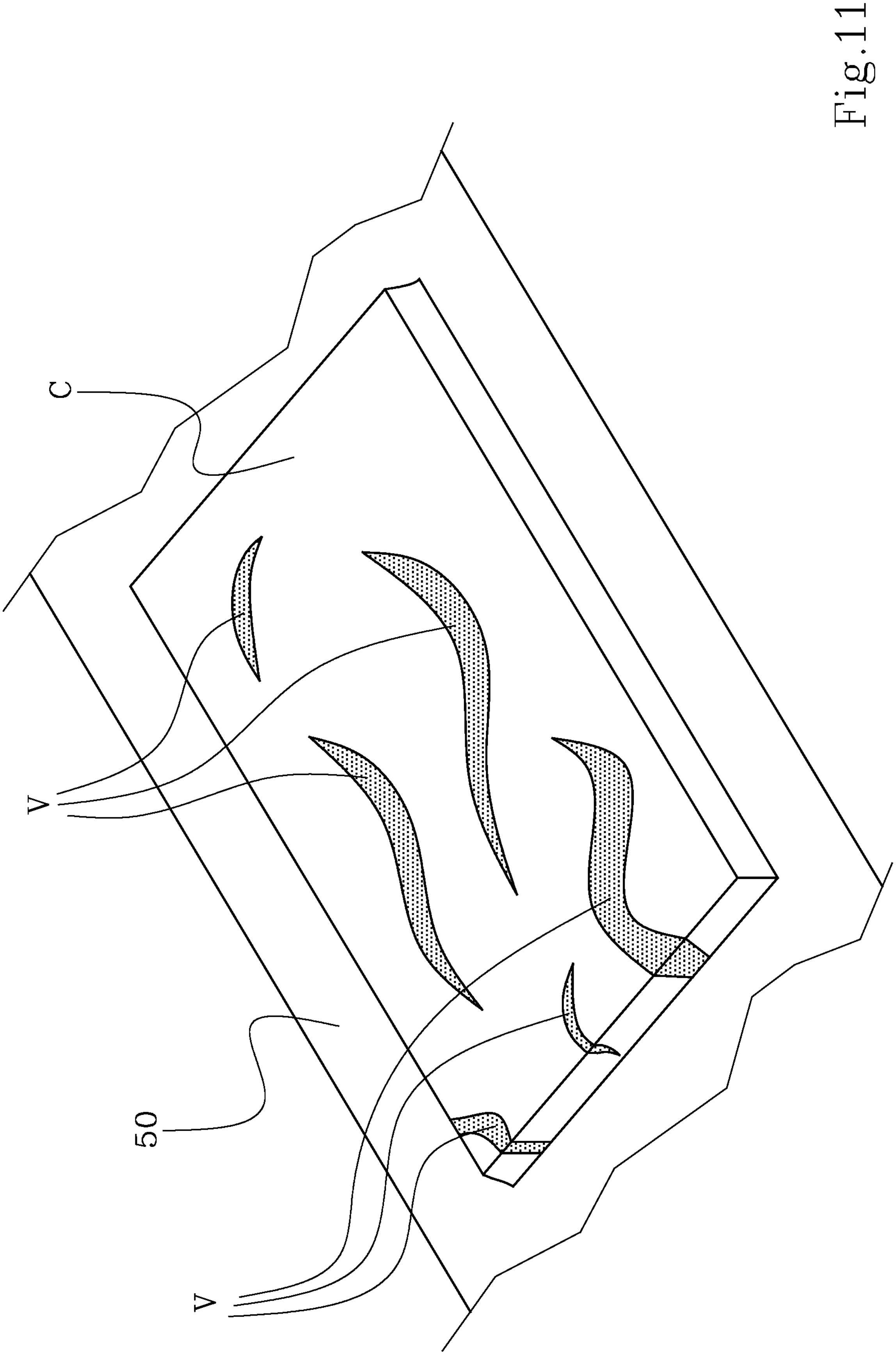

FIG. 11 schematically shows a semi-processed item which can be obtained with the machine according to the present invention.

The machine according to the present invention comprises a distributor unit (D), arranged to dispense, in a controlled manner, a ceramic compound in granular or powdered form. The ceramic compound can be formed by two or more different ceramic materials. The distributor unit (D) is arranged to deposit a layer of ceramic compound on an underlying deposit plane (50). Such a layer is intended to be subjected to pressing to create a compact slab which, subsequently, can be subjected to firing, to transform into a ceramic slab.

To obtain the laying of a ceramic layer, the distributor unit (D) and the deposit plane (50) are in relative motion along a longitudinal direction (Y), through means which will be described below.

In a preferred, but not exclusive embodiment, the distributor unit (D) comprises a dispensing device (E). The dispensing device (E) comprises two or more dispensing nozzles (N) each of which can dispense a ceramic material or a mixture of predetermined ceramic materials, for example of a different colour and/or shade and/or grain size. Preferably the various nozzles (N) are aligned to form a bar arranged parallel to a transverse direction (Z), perpendicular or inclined with respect to the longitudinal direction (Y). Thereby, the dispensing device (E) is capable of depositing material on a deposit front parallel to the transverse direction (Z).

Two or more dispensing devices (E), structured as described above, can be situated in succession, with respect to the longitudinal direction (Y), side by side, similar to the printing bars of a jet printer, of the type commonly used for decorating ceramic tiles. Each dispensing device can be loaded with a ceramic material or compound of predetermined features. The controlled activation of the dispensing devices (E), and of the dispensing nozzles (N) of each of them, allows the ceramic compound to be dispensed in a programmed manner and according to predetermined structures, for example to create a layer (C) comprising a decoration (V) in the form of veins or streaks of different colours and/or shades, as schematically shown in FIG. 11. Preferably, the decoration (V) extends at least partly inside the thickness of the layer (C) of ceramic compound.

The formation of a structure and/or a particular decoration made by the distributor device (D) is substantially similar to that made by an inkjet printer. In summary, the image or decoration is obtained by means of the controlled dispensing of ceramic compound carried out by the dispensing nozzles (N) of the distributor unit (D), in a manner similar to the image obtainable by an inkjet printer by means of the controlled dispensing of liquid dye carried out by the nozzles of an inkjet printer.

In particular, the image or decoration to be made is broken down into a series of volumes or pixels, each of which is formed by a predetermined quantity of ceramic compound. The dispensing of the predetermined quantity of ceramic compound intended to form a specific pixel is delegated to one or more dispensing nozzles (N) which are activated, for this purpose, in a predetermined sequence.

Each dispensing nozzle (N) is provided with digitally controllable shutter devices, to open and close and thus allow the passage of the relative ceramic material. The control of each dispensing nozzle (N) is entrusted to a control module. Such a control module can also be intended for controlling the other devices which are part of the machine according to the present invention.

As is well known in the art, the control module mentioned in the present description and in the following claims is generically referred to as a single unit, but can in fact be provided with distinct functional modules (memory modules or operating modules), each responsible for controlling a given device or cycle of operations. In substance, the control module can consist of a single electronic device, programmed to carry out the functions described, and the various functional modules can correspond to hardware and/or routine software programs which are part of the programmed device. Alternatively, or in addition, such functions can be performed by a plurality of electronic devices over which the aforesaid functional modules can be distributed. The units can further rely on one or more processors for the execution of the instructions contained in the memory modules. Furthermore, the units and the aforesaid functional modules can be distributed over different local or remote computers on the basis of the architecture of the network in which they reside.

The machine according to the present invention comprises a storage container (F), interposed between the distributor device (D) and the deposit plane (50) to store a certain quantity of ceramic compound dispensed by the distributor device (D). The storage container (F) comprises an unloading opening (O) arranged to allow the deposit of the ceramic compound on the deposit plane (50).

Before depositing on the deposit plane (50), the ceramic compound dispensed by the distributor device (D) passes through the storage container (F). The transit towards the deposit plane (50) is therefore not direct, but the ceramic compound temporarily accumulates inside the storage container (F) before depositing on the deposit plane (50).

By accumulating in the storage container (F), the ceramic compound maintains the structure and/or decoration prepared in a controlled manner by the distributor device (D). In other words, the interposition of the storage container (F) between the distributor unit (D) and the deposit plane (50) favours the maintenance of the structure of the decoration made with the distributor device (D).

In order for the ceramic compound inside the storage container (F) not to deform the structure and/or decoration prepared by the distributor device (D), it is also important that the amount of ceramic compound collected inside the storage container (F) remains substantially constant over time, and in particular that the ceramic compound maintains a uniform level inside the storage container (F). In fact, it can occur that, caused by local grain size differences of the ceramic compound, due for example to the presence of granules or particles of different sizes or weights, there is a different local fluidity of the ceramic compound. Such a different fluidity can cause different flow speeds of the ceramic compound inside the storage container (F), and thus a deformation of the structure and/or decoration prepared by the distributor device (D).

To prevent this from occurring, the machine according to the present invention comprises one or more sensors (S), connected to the aforementioned control module which is in charge, among other things, of the control of the distributor unit (D). The sensors (S) are arranged to detect a significant parameter of the quantity of ceramic compound contained in the storage container (F) and to process a corresponding measurement signal.

Preferably, but not exclusively, at least one sensor (S) is arranged to measure a level reached by the ceramic compound inside the storage container (F), understood as the height reached by the ceramic compound with respect to the unloading opening (O). In a further solution, at least one sensor (S) is arranged to measure the weight of at least a part of the ceramic compound inside the storage container (F). Obviously it is possible to simultaneously use sensors arranged for measuring the level and sensors arranged for measuring the weight. The various sensors (5) can be placed in suitable positions to allow the measurement of the respective significant parameter. For example, in the embodiment depicted, the sensors (S) are placed on a front wall of the storage container (F) and are arranged for measuring the level. In the preferred embodiment of the machine, several sensors (S) are included which are arranged to measure the level of the ceramic compound.

As already mentioned, each dispensing nozzle (N) is provided with a shutter device, which can be activated between a flow configuration, in which the dispensing of a ceramic material is determined, and a stop configuration. Each shutter device is controlled by the control module independently of the other shutter devices.

The control module is arranged to regulate the dispensing of ceramic compound carried out by the distributor unit (D) as a function of the measurement signal received from the sensors (S), so as to maintain a desired quantity of ceramic compound inside the container (F). Preferably, the control module is arranged to maintain a predetermined level of ceramic compound inside the storage container (F).

In particular, the control module is arranged to command an increase or a decrease in the flow rate of ceramic material, respectively in the event that the level of ceramic compound is lower or higher than the predetermined level.

The signal produced by each sensor (S) can be used by the control module to command one or more dispensing nozzles (N), in order to regulate the flow rate of ceramic compound released by each of them. Thereby, the level control in the storage container (F) can be divided into distinct areas, each of which is monitored by a sensor (S). In particular, in the solution illustrated in FIG. 1, the sensors (S) are side by side along the transverse direction (Z), at substantially the same height and spaced apart from each other by a predetermined pitch. The signal produced by each sensor (S) is used to command the dispensers (N) which are substantially aligned with that sensor (S) within two vertical planes, parallel to the longitudinal direction (Y), separated by a predetermined distance. Thereby, it is possible to compensate and balance any local disparities of the ceramic compound level, due to a different flowability or fluidity of the ceramic compound itself.

The variation of the flow rate of ceramic compound sent by the distributor unit (D) to the storage container (F) can be carried out in different modes.

According to a first mode, the flow rate is decreased, with respect to a steady flow rate, if the level of compound detected in the storage container (F) is greater than the predetermined level. Basically, the flow rate is decreased for a time necessary to lower the level of ceramic compound to the predetermined value. In the preferred embodiment of the machine, the flow rate decrease can be limited to the areas controlled by the sensor (S) or by the sensors (S) which detect an increase in the level of ceramic compound, acting on the corresponding dispensing nozzles (N).

In a second mode, the flow rate is increased, with respect to a steady flow rate, if the compound level detected in the storage container (F) is greater than the predetermined level. Basically, the flow rate is increased for a time necessary to raise the level of ceramic compound to the predetermined value. In the preferred embodiment of the machine, the flow rate increase can be limited to the areas controlled by the sensor (S) or by the sensors (S) which detect a decrease in the level of ceramic compound, acting on the corresponding dispensing nozzles (N).

It is also possible to use both modes at the same time.

The flow rate dispensed by the distributor unit (D) is substantially regulated by regulating the flow rate dispensed by each dispensing nozzle (N). In particular, the control module regulates the flow rate by acting on one or more of the following parameters:

- the frequency of the opening/closing command of the shutter device of each dispensing nozzle (N);
- the duration of the opening/closing command;
- the current intensity of the opening/closing command signal;
- the voltage of the opening/closing command signal.

In general terms, the variation of only one of the parameters listed above, keeping the others constant, causes a variation in the flow rate dispensed by the dispensing nozzle (N). By simultaneously varying, in a coordinated manner, two or more of the parameters listed above, it is also possible to cause a more or less rapid change in the flow rate dispensed by the dispensing nozzle (N).

In a possible embodiment, the shutter devices can be activated between the flow and stop configurations by means of a pneumatic command. In this embodiment, the control module is arranged to regulate the pneumatic command to each shutter device, varying one or more of the parameters listed above with reference to the pneumatic command of each shutter device.

In general, the control module regulates the quantity of ceramic compound dispensed by the distributor unit (D) as a function of the measurement signal received by the sensor or sensors (S). It is thereby possible to regulate or maintain the quantity of ceramic compound collected in the storage container (F) to a predetermined value, chosen based on the grain size features of the ceramic compound and on the features of the decoration to be made.

The storage container (F) comprises a first wall (33*a*) and a second wall (33*b*), which delimit a collection space (33*c*). The first wall (33*a*) is arranged and shaped so as to intercept the material coming from the distributor unit (D), to guide or switch the trajectory thereof inside the collection space (33*c*). The second wall (33*b*) is situated upstream of the first wall (33*a*) with respect to the direction of relative motion between the storage container (F) and the deposit plane (D). The second wall (33*b*) is situated so as to contain the material, intercepted by the first wall (33*a*), falling downwards.

For example, the sensors (S) are associated with the first wall (33*a*).

The collection space (33*c*) is further delimited by two further transverse walls, not shown, joining the walls (33*a*, 33*b*).

The two walls (33*a*, 33*b*) preferably have an inclination close to the vertical, to limit the internal flowing of the material.

In essence, in the embodiment depicted, the two walls (33*a*, 33*b*) define a hopper which collects the material coming from the distributor unit (D) and deposits it on the deposit plane (50).

The unloading opening (O) is delimited by the lower edges of the walls defining the container (F). In particular, the first wall (33*a*) has a lower edge (E) which is raised by a certain height with respect to the deposit plane (50). The material accumulated inside the collection space (33*c*) is progressively deposited on the deposit plane (50) and is dragged forward by the latter, passing under the lower edge (T) which also allows levelling the upper surface of the continuous layer (C). Preferably, the second wall (33*b*) has a lower edge close to the deposit plane (50), at a height such as to prevent any passage of material. By accumulating inside the collection space (33) and, progressively, unloading onto the deposit plane (50), the material maintains the structure of the decoration (V) intended to be made on the layer (C).

The precise control of the quantity of ceramic compound inside the container (F), obtained by virtue of the sensors (S) and the interaction between the latter, the control module and the distributor unit (D), allows to maintain the structure of the decoration (V) with great precision, and to transfer the decoration (V) with the expected configuration and definition on the deposit plane (50).

Figure 3:
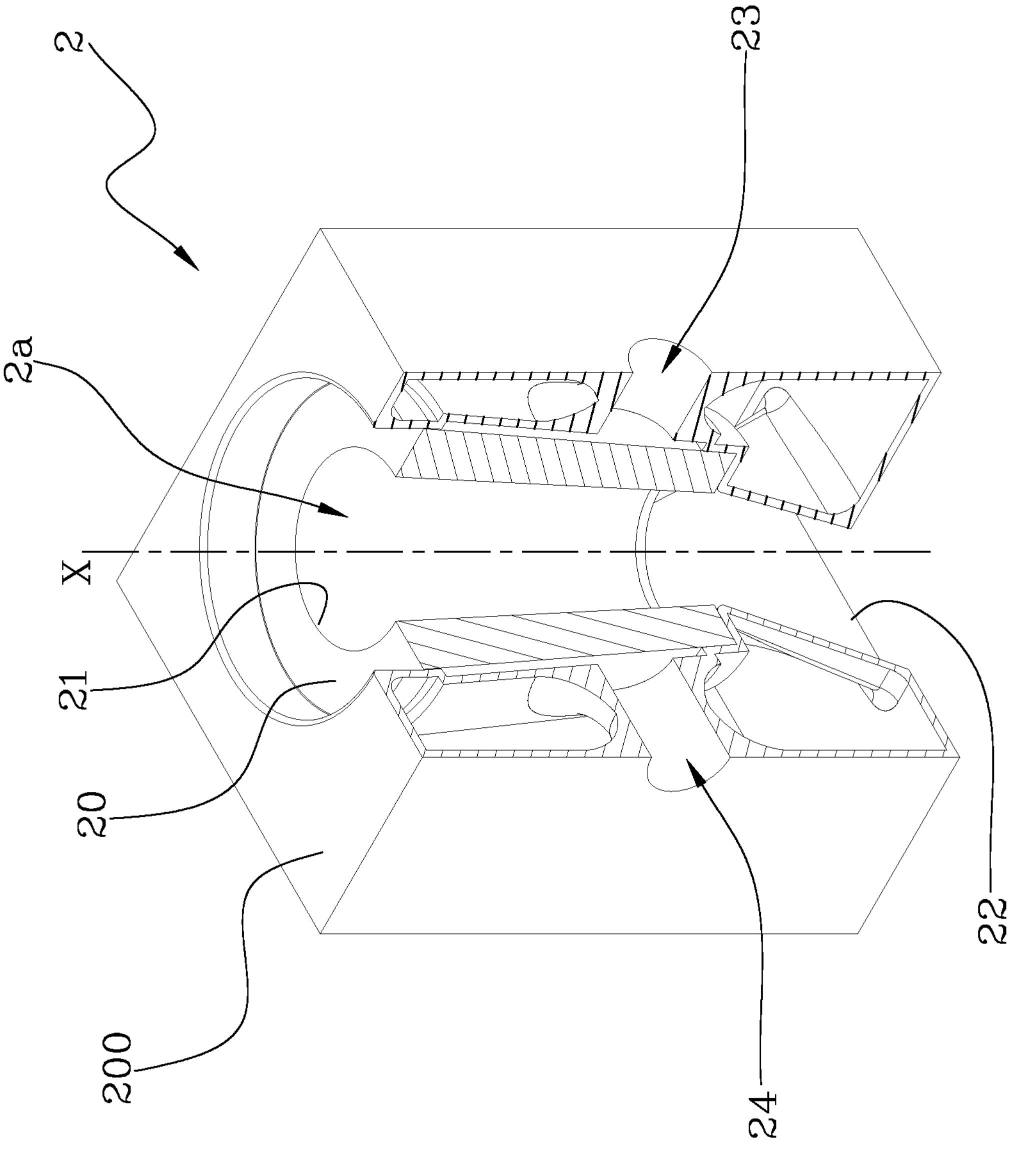
FIG. 3 shows a schematic isometric and partially sectional view of a component of the machine.
Figure 4:
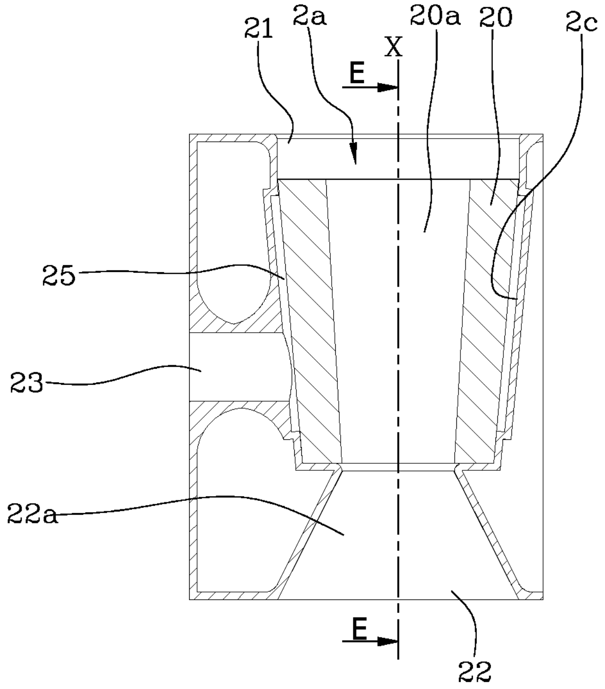
FIG. 4 shows a sectional view of the component of FIG. 3.
Figure 5:
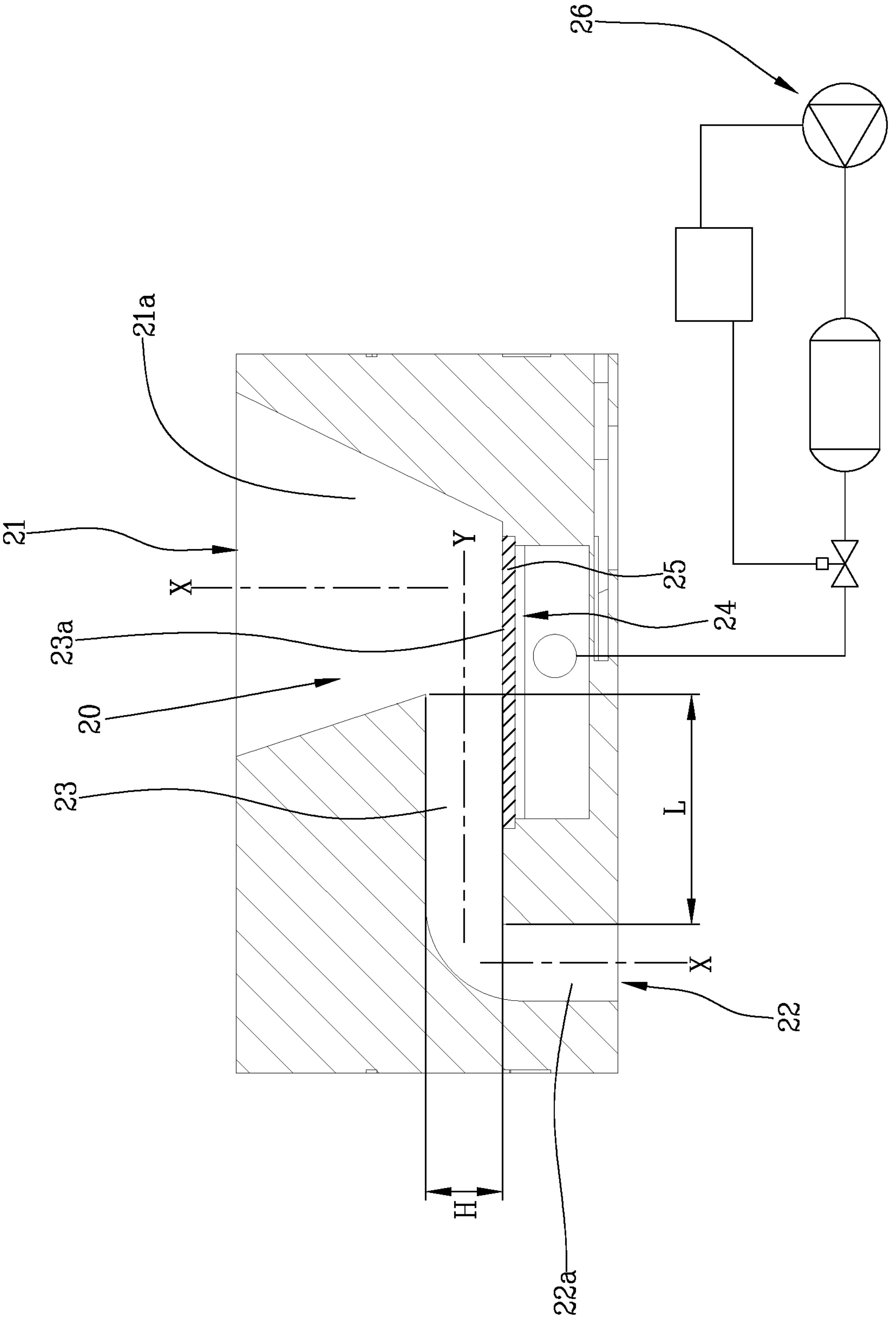
FIG. 5 shows a sectional view of an alternative embodiment of the component of FIG. 4.
Figure 6:
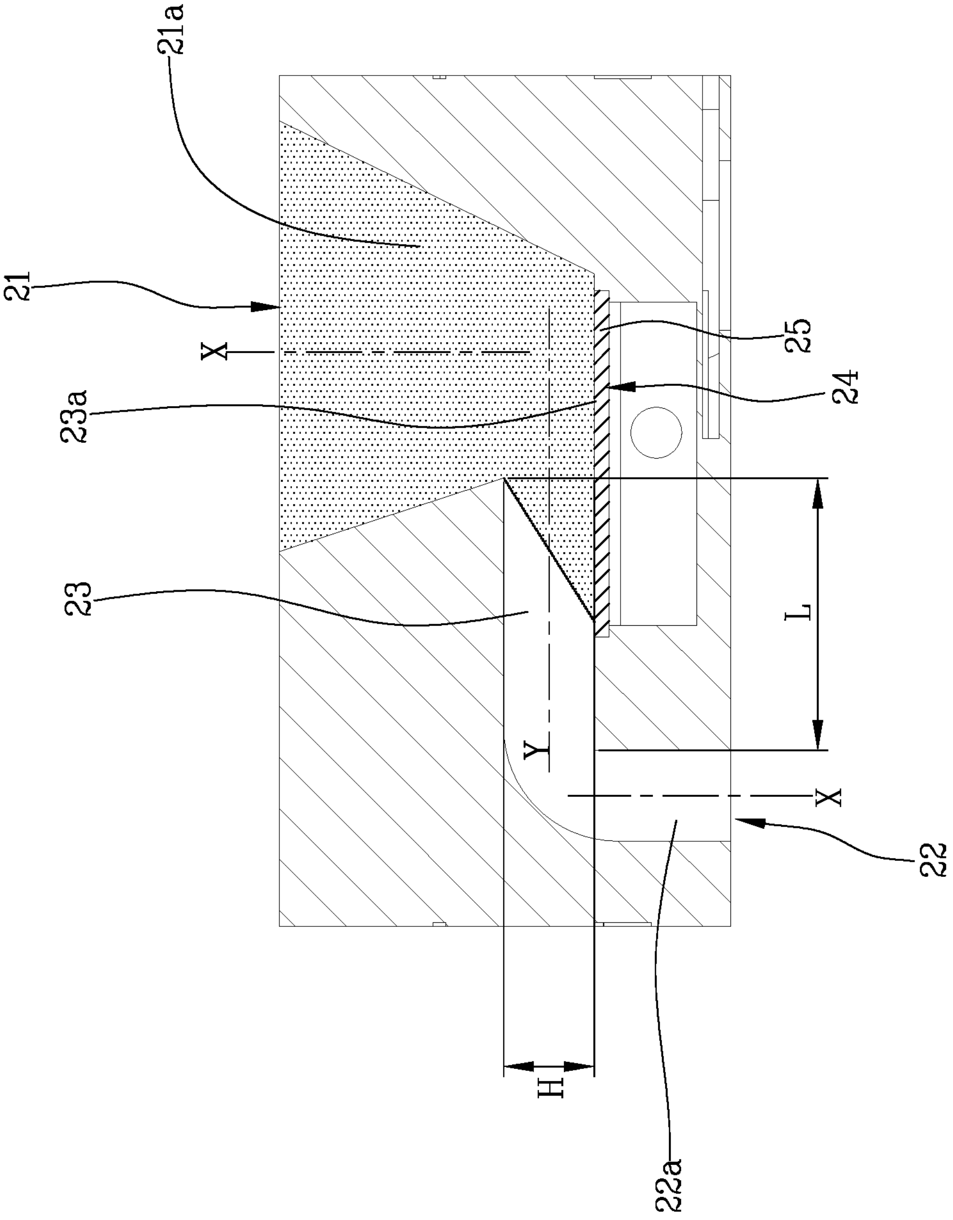
FIG. 6 shows a second sectional view of the component of FIG. 5.
Figure 7:
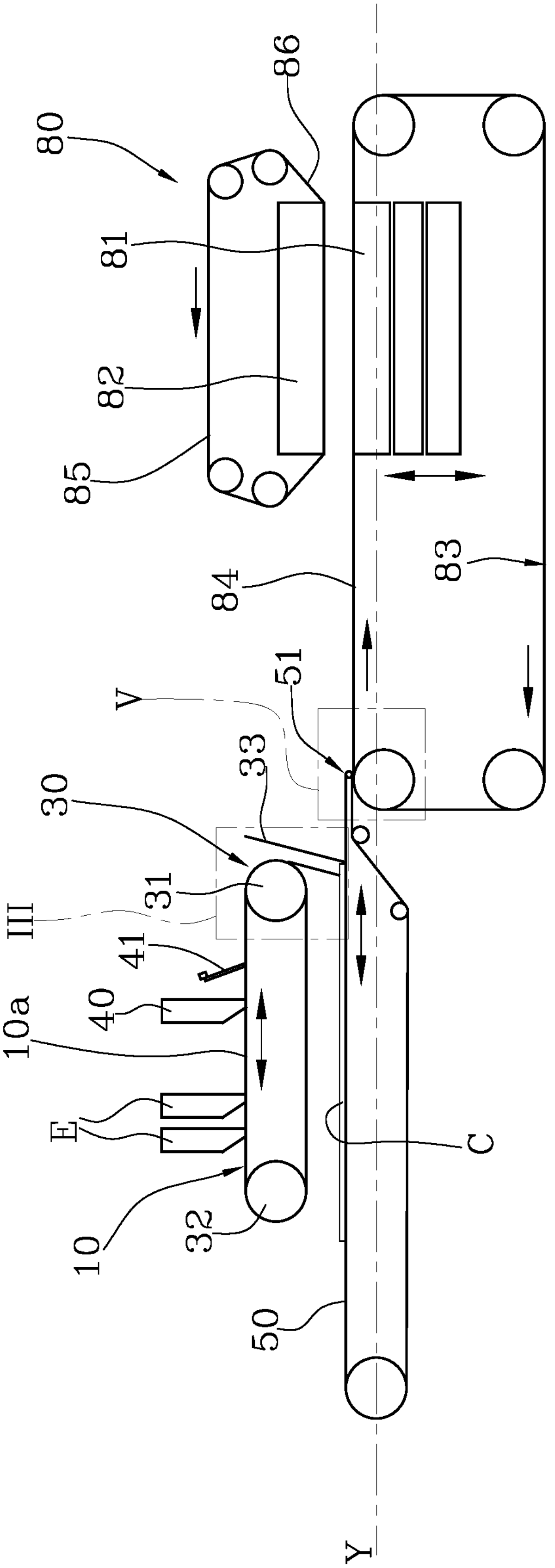
FIG. 7 shows a schematic side view of the machine according to the present invention.
Figure 8:
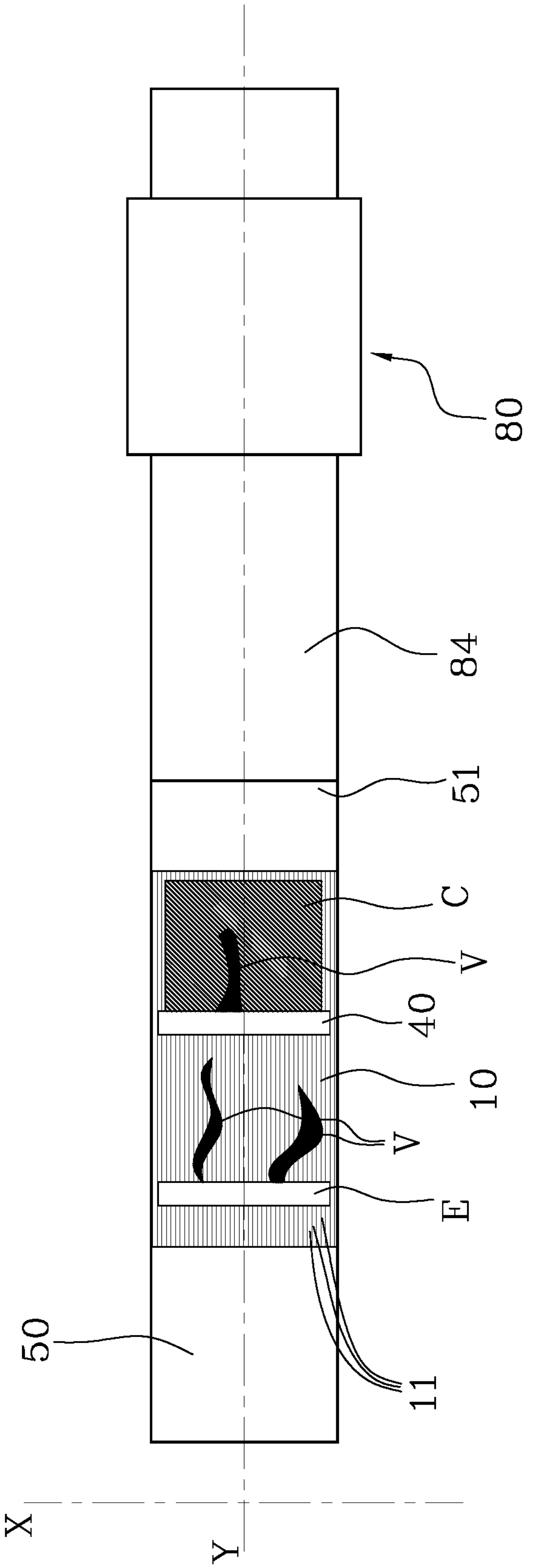
FIG. 8 shows a top view of the machine of FIG. 7.
Figure 9:
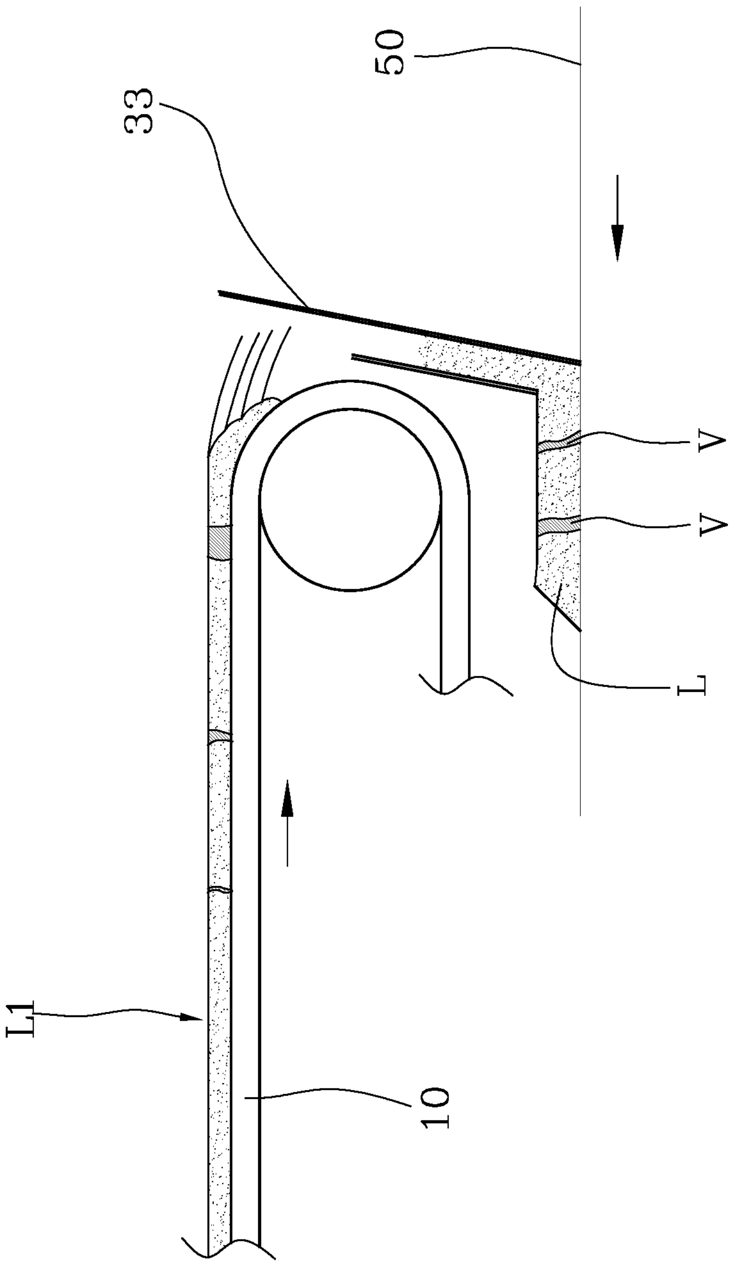
FIG. 9 shows an enlargement of area III of FIG. 7.
Figure 10:
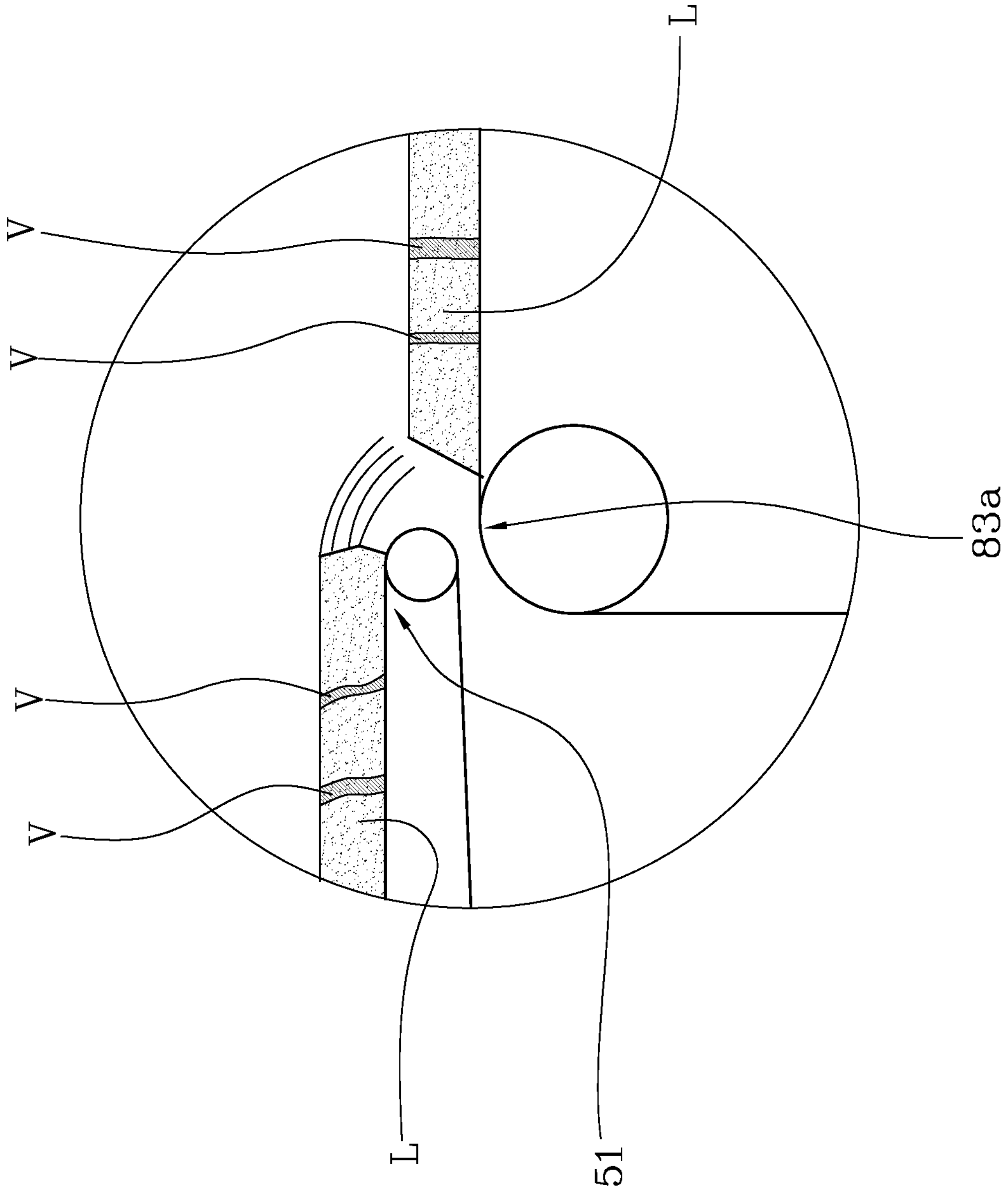
FIG. 10 shows an enlargement of area V of FIG. 7

A possible embodiment of the dispensing nozzle (N), in which a pneumatic command is included for activating the flow and stop configurations, is schematically shown in FIGS. 3,4,5. The dispensing nozzle (N) comprises a dispensing channel (2*a*), provided with a longitudinal axis (X). In the embodiment shown, the dispensing channel (2*a*) is centrally symmetrical with respect to the longitudinal axis (X). Preferably, but not necessarily, the dispensing channel (2*a*) has a circular cross section in a plane perpendicular to the longitudinal axis (X), but it could be provided with an oval or ellipsoidal cross section. The dispensing channel (2*a*) could however have a different shape, for example it could have a prismatic shape, or it could have a quadrangular or polygonal contour on a section plane perpendicular to the longitudinal axis (X).

The dispensing channel has an inlet opening (21), for feeding the product, and an outlet opening (22) for dispensing the product.

Preferably the dispensing channel (2*a*) is arranged so that the longitudinal axis has an inclination such as to allow the product to flow by gravity from the inlet opening (21) to the outlet opening (22). For example, the dispensing channel (2*a*) is arranged with the longitudinal axis (X) oriented vertically.

The inlet opening (21) can be connected to a tank or other device for feeding the product.

In the embodiment shown, the outlet opening (22) has a quadrangular contour on a section plane perpendicular to the longitudinal axis (X).

Moreover, the outlet opening (22) is positioned at the end of an outlet section (22*a*) of the dispensing channel (2*a*) which has a diverging shape towards the outlet opening (22). Other shapes for both the outlet opening (22) and the outlet section (22*a*) would however be possible, for example a cylindrical or truncated-conical shape. The embodiment shown in the figures offers the advantage of allowing the side by side arrangement of multiple outlet openings (22) in a compact configuration.

The dispensing device according to the present invention comprises suction means arranged to retain, on command at least a part of the product inside the dispensing channel (2*a*), so as to form an accumulation which obstructs the dispensing channel (2*a*) and prevents the flow of the product. In substance, the suction means is structured to cause an accumulation or stagnation of product which, by increasing the friction between the particles which form the product, causes the clogging and blocking of the dispensing channel (2*a*).

The suction means according to the present invention offers the important advantage of not compressing or crushing the product. In fact, the product becomes clogged inside the dispensing channel (2*a*) substantially by means of the mutual friction of the particles. This is very advantageous for example in the case in which the product is atomised ceramic which, as known, is composed of hollow spherical particles. The advantage of not compressing or squeezing the product is also significant in the presence of an especially abrasive product.

In the illustrated embodiment, the suction means is placed in communication with the dispensing channel (2*a*). The suction means, on command, attracts and retains at least a part of product inside the dispensing channel (2*a*). For example, the suction means retains at least a part of product in contact with or near at least one inner surface (2*c*) of the dispensing channel (2*a*), to form an accumulation which obstructs the dispensing channel (2*a*). As already underlined, the product retained in contact with the inner surface (2*c*) of the dispensing channel (2*a*) reduces the passage section of the latter and forms the accumulation or blockage which prevents the flow of the product. The deactivation of the suction means frees the product which can resume flowing along the dispensing channel (2*a*).

In substance, the suction means is arranged to produce a negative pressure which is placed in communication with the dispensing channel (2*a*). To this end, the suction means comprises for example a vacuum pump, or a circuit comprising a Venturi conduit placed in communication with the dispensing channel (2*a*). Other means and devices capable of producing a negative pressure are also suitable for the purpose.

In the illustrated embodiment, the dispensing device comprises one or more suction openings (23), formed through a wall of the dispensing channel (2*a*) and placed in communication with the suction means. In the embodiment shown, the device comprises a suction opening (23), formed through the wall which delimits the dispensing channel (2*a*). The suction opening (23) opens onto the inner surface (2*c*) of the dispensing channel (2*a*). In a possible embodiment, not shown, the dispensing device can be provided with a plurality of suction openings (23), in the form of micro-holes or holes of small diameter, formed through the wall of the dispensing channel (2*a*), which open onto the inner surface (2*c*) of the dispensing channel.

The suction openings (23) present are connected to the suction means.

In a condition of product flow through the dispensing channel (2*a*), the activation of the suction means produces a suction effect of the product in the direction of the suction opening (23). The product is thus attracted and retained in contact with or near the inner surface (2*c*) of the dispensing channel (2*a*), forming the accumulation which obstructs the channel (2*a*) itself. The deactivation of the suction means frees the accumulation of product, allowing the restoration of the flow.

The values of negative pressure can vary from 100 mb to 400 mb.

Preferably, a filter (A) is interposed between each suction opening (23) and the dispensing channel (2*a*). The filter (A) prevents the product from flowing through the suction opening (23). In the presence of the negative pressure or suction, i.e., in the activation condition of the suction means, the product adheres to the filter (A).

In a possible embodiment, the filter (A) defines at least a portion of the wall of the dispensing channel (2*a*), or defines a portion of the inner surface (2*c*) of the dispensing channel. For example, if the dispensing channel (2*a*) has a prismatic shape, the filter (A) can be made in planar shape, and define a portion of the wall of the dispensing channel at which the suction opening (23) opens. This applies to each suction opening (23) present.

In the absence of the filter (A), the product is retained in contact with the inner surface (2*c*) of the dispensing channel (2*a*). In the presence of the filter (A), the product is retained at least partly in contact with the surface of the filter (A). The product retained on the surface of the filter (A) is therefore located near the inner surface (2*c*) of the dispensing channel (2*a*), i.e., the filter (A) is interposed between the product and the inner surface (2*c*) of the dispensing channel (2*a*).

The filter (A) can have various known structures. The structure of the filter must be chosen in relation to the features of the product to be dispensed, i.e., the filter must be able to retain the particles or granules of the product to be dispensed.

In the embodiment shown, in which the dispensing channel (2*a*) is centrally symmetrical with respect to the longitudinal axis (X), the filter (A) has a tubular shape and is inserted into the dispensing channel (2*a*). The filter (A) internally delimits a passage (B), i.e., a hole, which defines at least a section of the dispensing channel (2*a*). The filter (A) is overlapping the suction opening (23). Further suction openings (23) can possibly be positioned on the section of the dispensing channel (2*a*) occupied by the filter (A).

In this embodiment the product normally flows along the longitudinal axis (X), through the passage (B) defined inside the filter (A) along the dispensing channel (2*a*). In the presence of an activation command of the suction means, the material adheres and is retained in the passage (B) in contact with the filter (A), substantially in the area of the suction opening (23) and of the further suction openings (23) if present.

Figure 2:
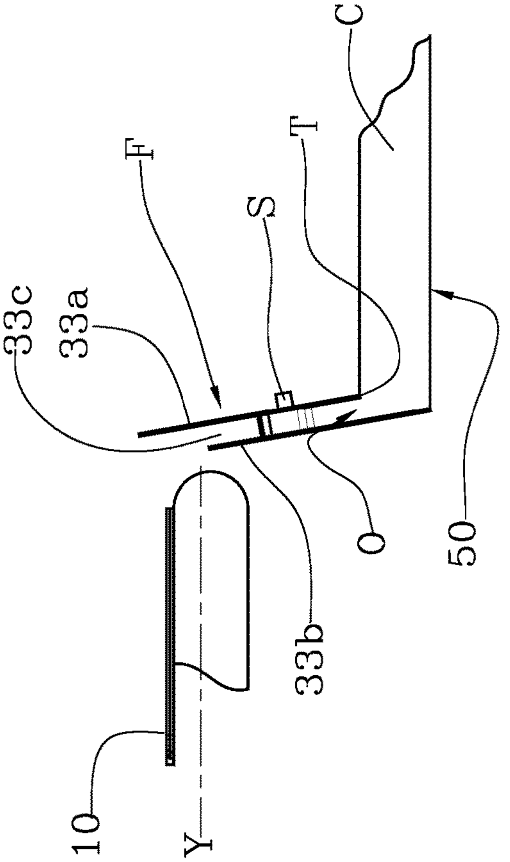
FIG. 2 shows a side view of the machine of FIG. 1.

In the embodiment shown, the dispensing device comprises an annular chamber (25) concentric with the filter (A) and placed in communication with the suction means. As shown in FIG. 2, the annular chamber (25) is defined on a wall of the dispensing channel (2*a*), in the form of a recess in the wall itself. The filter (A) is inserted in the dispensing conduit (2*a*) overlapping the annular chamber (25) and separating the chamber (25) itself from the passage (B) available for the flow of the product. The suction openings (23) present are positioned on a wall of the annular chamber (25), as shown in FIG. 2. The presence of the annular chamber (25) allows to distribute the suction effect or the negative pressure produced by the suction means around the entire filter (A). Thereby, the product is attracted and retained on a circular crown, i.e., on a ring-like surface of the filter (A), forming an equally annular accumulation which is capable of blocking the dispensing conduit (2*a*) very quickly.

To facilitate the restoration of the dispensing of the product after a step of stopping, i.e., after a step of activation of the suction means, the dispensing device is provided with blowing means, placed in communication with the dispensing channel (2*a*) and arranged to produce a pressure which, in terms of absolute value, is greater than or equal to the negative pressure produced by the suction means in the dispensing channel (2*a*).

In a possible embodiment, one or more blowing openings (24) are formed through a wall of the dispensing channel (2*a*). In the solution which includes the filter (A), the blowing openings (24) are formed at the filter (A) itself, to direct the flow of air through the latter and to promote the detachment of the product. In the embodiment shown, one or more blowing openings (24) are positioned on the wall of the annular chamber (25). In an alternative embodiment, the flow of air produced by the blowing means could be introduced into the dispensing channel (2*a*) through the suction opening or openings (23), previously connected to the blowing means by a distributor, not shown, structured to alternately connect the blowing means or the suction means to the suction openings (23).

The control of the dispensing device substantially occurs through the control of the suction means and/or the blowing means, if present.

In the embodiment comprising only the suction means, the activation of the latter retains at least a part of the product in contact with a wall of the dispensing channel (2*a*) causing the occlusion thereof. The deactivation of the suction means frees the product which resumes flowing along the dispensing channel (2*a*).

In the case in which the blowing means is also included, the control of the dispensing of the product can occur in different modes. In a first mode, the dispensing of the material is commanded by deactivating the suction means and, simultaneously or subsequently, activating the blowing means. In a second mode, the suction means can be maintained always active and, to allow the dispensing of the product, the blowing means is activated, whose effect contrasts and cancels the retaining effect produced by the suction means. In the solution in which the pressure produced by the blowing means is substantially equal, in absolute value, to the negative pressure produced by the suction means, the activation of the blowing means cancels the negative pressure produced by the suction means, causing the release of the product.

In the solution in which the pressure produced by the blowing means is greater, in absolute value, than the negative pressure produced by the suction means, the activation of the blowing means produces the introduction of an airflow into the dispensing channel (2*a*). The introduction of an air flow fluidises the product, causing a rapid detachment from the wall of the dispensing channel (2*a*) and/or from the filter (A).

The activation/deactivation of the suction means and/or of the blowing means according to a predetermined time cycle allows varying the quantity of dispensed product in a very precise manner. For example, it is possible to dispense the product in small subsequent quantities, defined through corresponding activation/deactivation cycles of the suction means and/or the blowing means.

A predetermined number of dispensing devices according to the present invention can be arranged along an alignment direction (Z), arranged side by side, to obtain a dispensing bar of predetermined length. The outlet openings (22) are side by side and are facing in a same direction. For example, the outlet openings (22) are facing downwards. By obtaining an outlet opening (22) in a flattened form, as shown in the figures, it is possible to arrange the dispensing devices relatively close together, bringing the outlet openings (22) closer to each other. Preferably, the outlet openings (22) are arranged on a same dispensing plane, preferably horizontal. The dispensing bar allows to define a dispensing front of predetermined length along the alignment direction (Z) of the dispensing devices. For example, in the case summarised above of deposit on an underlying movable plane, the dispensing bar, arranged with the alignment direction of the dispensing devices transverse, in particular perpendicular, to the transport direction of the movable plane, substantially allows depositing the product over the entire width of the movable plane, understood as an extension measured perpendicular to the conveying direction, without the need to translate the dispensing bar transversely to the conveying direction.

The dispensing channel (2*a*), the suction opening or openings (23) and the blowing opening(s) (24) present are formed in a body (200). To define the dispensing bar, two or more dispensing devices (2) can be arranged side by side. There can be two or more dispensing devices (2) joined at the side surfaces of the respective bodies (200).

An alternative embodiment of the dispensing nozzle (N), which can be activated by a pneumatic command, is illustrated in FIGS. 6,7,8,9. The dispensing nozzle (N) comprises a dispensing channel (2_a_). The dispensing channel has an inlet opening (21), for feeding the product, and an outlet opening (22) for dispensing the product. The inlet (21) and outlet (22) openings can have different profiles. In the illustrated preferred but not exclusive embodiment, the openings (21, 22) have an elongated quadrangular profile, i.e., they are in the form of slots. Such a configuration of the inlet and outlet openings (21, 22) allows two or more dispensing devices (2) to be compactly arranged side by side.

Preferably, the outlet opening (22) is positioned at the end of an outlet section (22_a_) of the dispensing channel (2_a_) which has a longitudinal axis (X) inclined so as to allow the granular material to flow by gravity through the outlet opening (22). For example, the outlet section (22_a_) is oriented vertically. Likewise, the inlet opening (21) also has a longitudinal axis (X) oriented so as to facilitate the entry of the granular material by gravity. For example, the inlet opening (21) is positioned at the end of an inlet section (21_a_) oriented vertically. Furthermore, the inlet section (21_a_) is shaped like a hopper, i.e., it has a decreasing section from the top down. In the embodiment shown, the inlet section (21_a_) and the outlet section (22_a_) have, on a section plane perpendicular to the respective longitudinal axis (X), an elongated rectangular contour. The embodiment shown in the figures offers the advantage of allowing the side by side arrangement of multiple outlet openings (22) and multiple inlet openings (21) in a compact configuration.

The dispensing channel (2_a_) comprises an intermediate section (23) which has a longitudinal axis (Xi). In the embodiment shown, the intermediate section is concentric to the longitudinal axis (Xi) thereof. Preferably, on a section plane perpendicular to the longitudinal axis (Xi) thereof, the intermediate section has a rectangular contour. In the embodiment shown, the intermediate section (23), the inlet section (21_a_) and the outlet section (22_a_) have the same width, measured on a section plane perpendicular to the longitudinal axis (XI) of the intermediate section. This allows a homogeneous flow of the granular material.

On a vertical plane containing the longitudinal axis (XI), the intermediate section has a length (L), measured as the minimum distance between the edges of the inlet (21) and outlet (22) openings, and a height (H), measured perpendicular to the length (L). For example, the height (H) is measured between a junction area or edge (E) between the inlet opening (21) and the intermediate section (23), and a bottom wall (23_a_) of the intermediate section (23).

The intermediate section (23) is configured to allow the deposit and accumulation of a predetermined quantity of granular material coming from the inlet opening (21). In other words, the intermediate section (23) is configured so that the granular material, fed to the inlet opening (21), deposits and accumulates in the intermediate section (23) and, in the absence of further stresses, does not flow along the intermediate section (23) towards the outlet opening (22).

In the preferred but not exclusive embodiment shown, the intermediate section (23) has an inclination, with respect to a horizontal plane, a height (H) and a length (L) which are such as to halt by force of gravity the flow of the material from the inlet opening (21) towards the outlet opening (22).

The principle for configuring the intermediate section (23) so that it can allow the deposit and accumulation of granular material, i.e., so that it can stop the flow of granular material from the inlet opening (21) towards the outlet opening (22), takes into account the internal angle of repose (a) of the granular material. As is well known, a granular material, when deposited by gravity on a horizontal plane, forms a conical pile whose basic angle is precisely called the "angle of repose" or "angle of shear strength".

The internal angle of repose (a) is measured with respect to the bottom wall (23_a_) of the intermediate section (23).

For example, with the internal angle of repose (a) of the granular material known, the height (H) by the cotangent of the internal angle of repose (a) is smaller than the length (L) of the intermediate section (23):

$$H \times ctg(a) < L$$

Thereby, the granular material coming from the inlet opening (21) is arranged resting and accumulates on the bottom of the intermediate section (23), without being able to reach the outlet opening (22), as shown in FIG. 3_a_.

The intermediate section (23) is therefore misaligned with respect to the inlet opening (21) and the outlet opening (22), i.e., the inlet opening (21), the intermediate section (23) and the outlet opening (22) are not concentric with one another. In the embodiment shown, the bottom wall (23_a_) of the intermediate section (23) has a substantially horizontal inclination.

The shape of the intermediate section (23) therefore allows to halt the flow of the granular material, i.e., to prevent the dispensing of the material itself, without the need for mechanical opening/closing members which, in addition to being expensive and problematic to control, can damage the granular material.

To allow the flow of granular material from the intermediate section (23) towards the outlet opening (22), the dispensing device (2) comprises motor means. Such motor means can be activated on command to cause the granular material to flow in advancement from the intermediate section (23) towards the outlet opening (22). In essence, the action of the motor means advances the granular material along the intermediate section (23) to the outlet section (22_a_), through which the granular material falls by gravity passing through the outlet opening (22).

In a possible embodiment, the motor means comprises a vibrating device, arranged to transmit controlled vibrations to the intermediate section (23). The vibrations transmitted to the intermediate section (23) are such as to cause the granular material to flow towards the outlet opening (22).

In the preferred but not exclusive embodiment shown, the motor means comprises pneumatic means (24, 25, 26), provided with a blowing opening (24) situated along the intermediate section (23). The pneumatic means (24, 25, 26) can be activated on command to send, inside the intermediate section (23), an air flow such as to produce the outflow towards the outlet opening (22) of the granular material deposited and accumulated in the intermediate section (23).

The air flow introduced into the intermediate section (23) through the blowing opening (24) fluidises and drags the granular material towards the outlet opening (22), through which the granular material is dispensed to the outside. In the embodiment shown, once the outlet opening (22) has been reached, the granular material falls downwards by gravity.

Preferably, but not necessarily, the blowing opening (24) is situated on the lower wall (23_a_) of the intermediate section (23). Such positioning of the blowing opening (24) causes the air flow to also lift the granular material, effectively favouring the flow towards the outlet opening (22). Preferably, a filter (25) is associated with the blowing opening (24). The filter (25) is structured to prevent the granular material from entering the blowing opening (24). In the embodiment depicted, the dispensing channel (2*a*), the inlet opening (21), the outlet opening (22) and the blowing opening (24) are obtained in a body (200), illustrated in FIG. 1.

The pneumatic means (24, 25, 26) comprises a dispensing device (26), for example a compressor, connected to the blowing opening (24). The dispensing device (26) is provided with control means which can be activated on command to send an air flow to the blowing opening (24). In a possible embodiment, the dispensing device (26) is connected to a storage tank, in turn connected to the blowing opening (24) through a feeding conduit. Such a feeding conduit is provided with a solenoid valve, associated with a control module which, according to a defined time cycle, commands the opening and closing of the solenoid valve to cause the dispensing of the granular material through the outlet opening (22).

The activation/deactivation of the motor means according to a predetermined time cycle allows to vary the quantity of dispensed product in a very precise manner. For example, it is possible to dispense the product in small subsequent quantities, defined through corresponding activation/deactivation cycles of the motor means, whether they are in the form of vibrating means or in the form of blowing means (24, 25, 26). In both solutions, controlling the dispensing of the granular material does not require the intervention of mechanical shutters, with the same advantages already indicated above.

Also in this embodiment, a predetermined number of dispensing devices according to the present invention can be arranged along an alignment direction, arranged side by side, to obtain a dispensing bar of predetermined length. By obtaining an outlet opening (22) in a flattened form, as shown in the figures, it is possible to arrange the dispensing devices relatively close together, bringing the outlet openings (22) closer to each other. Such a printing bar allows to define a dispensing front extended along the alignment direction of the dispensing devices. For example, in the case summarised above of deposit on an underlying movable plane, the printing bar arranged with the alignment direction of the dispensing devices perpendicular to the conveying direction of the movable plane substantially allows to deposit the product over the entire width of the movable plane, understood as an extension measured perpendicular to the conveying direction.

In the preferred but not exclusive embodiment illustrated in FIGS. 10 to 13, the distributor unit (D) comprises an intermediate deposit element (10), provided with a plurality of cavities (11) of predetermined shape and depth or height. Each of such cavities (11) has an opening which allows the entry of the powdered material and a subsequent unloading of the powdered material previously introduced. Each cavity (11) is delimited by a side wall and a bottom which can be substantially flat or curved.

In a particularly advantageous embodiment, the intermediate element (10) comprises a flexible belt on which the cavities (11) are formed, which open onto the surface of the belt itself. For example, the cavities (11) can be formed by incision or impression on the surface of the flexible belt. In the preferred but not exclusive embodiment shown, the intermediate element (10) is in the form of a flexible belt, closed in a loop.

In a preferred but not exclusive embodiment, the cavities (11) comprise a plurality of elongated grooves, parallel to each other. Such elongated grooves have a closed bottom and are delimited laterally by two walls, which can be parallel or inclined to each other, converging towards the bottom. In a possible embodiment, the elongated grooves have, on a transverse plane, a V-section. Preferably, the cavities (11) are adjacent to one another.

In this first embodiment, the cavities (11) can be arranged parallel to the longitudinal direction (Y) of advancement, or they can be inclined with respect to the longitudinal direction (Y) on the same plane as the latter. Preferably, but not necessarily, the cavities (11) are all in the form of elongated grooves. Furthermore, the cavities (11) occupy the entire surface of the intermediate element (10). This promotes the filling of the cavities (11) themselves.

In a second possible embodiment, not illustrated, the cavities (11) have a prismatic shape, for example they have a rhomboidal contour, but other forms are obviously possible.

The dispensing nozzles (21), situated above the intermediate element (10), are arranged to deposit a predetermined quantity of powdered material inside one or more predetermined cavities (11).

The distributor unit (D) further comprises an unloading device (30), arranged to move the cavities (11) from a loading position, in which they can receive the powdered material from each dispensing device (E), to an unloading position, in which they can unload the powdered material. In a particularly advantageous embodiment, the unloading device (30) is structured to move the cavities (11) between a loading position, in which they are facing upwards to receive the powdered material from the dispensing nozzles (21), and an unloading position in which they are facing at least partially downwards to unload the powdered material essentially by gravity. The movement between the loading position and the unloading position, carried out by the unloading device (30), occurs by translation along a longitudinal direction (Y) of advancement, as will be better clarified below.

In a preferred, but not exclusive embodiment, in which the intermediate element (10) comprises a flexible belt, the unloading device (30) comprises a pair of rollers (31, 32) around which the intermediate element (10) is wound, so as to define a closed-loop path. The cavities (11) are facing towards the outside of said closed path.

Along the path defined by the rollers (31, 32), the intermediate element (10) has an upper section (10*a*), along which it slides in advancement along the longitudinal direction (Y) and along which the cavities (11) are facing upwards, in the loading position. The dispensing device (E) is situated above the intermediate element (10), i.e., above the upper section of the intermediate element (10), so as to be able to unload the powdered material downwards and towards the cavities (11). In other words, in the passage from the loading position to the unloading position, the cavities (11) pass from a position in which they are facing upwards to a position in which they are facing downwards. During such a passage, each cavity (11) can pour the content thereof downwards. As schematically shown in FIG. 13, the passage of the cavities (11) from the loading position to the unloading position occurs progressively along the section of the intermediate element (10) which turns around a first roller (31). When each cavity (11) is located facing downwards, i.e., after having travelled around the first roller (31), the pouring of the contents is substantially complete. By turning around the second roller (32), the cavities (11) move back into the loading position, to receive a new load of powdered material.

The loading of the cavities (11) occurs during an advancement movement of the intermediate element (10) along the longitudinal direction (Y). In essence, while the intermediate element (10) advances, the nozzles (21) send the powdered material to the cavities (11) in a selective and targeted manner, in relation to a decorative texture which is intended to be made.

Not necessarily, it is possible to include a filling device (40), arranged to fill any cavities not filled by the dispensing nozzles (21) present. The filling device (40) can be used to dispense a ceramic material or compound specific for colour and/or grain size or other parameter. In essence, the filling device (40) unloads the material thereof to fill the hollow or partially empty cavities (11) downstream of the dispensing device(s) (E), and covers the cavities (11) which may have already been filled. A doctor blade (41) is arranged in contact with the upper section of the intermediate element (10), downstream of the filling device (40), to remove the powdered material in excess of the depth or height of the cavities (11), and which therefore protrudes from the upper surface of the intermediate element (10). The doctor blade (41) is preferably solidly constrained to the filling device, i.e., is defined by an edge of the filling device (40).

The deposit plane (50) is situated below the distributor unit (D). As already indicated, a relative motion is included between the distributor unit (D) and the deposit plane (50), directed along the longitudinal direction (Y), which occurs at the same time as the unloading of the ceramic compound from each dispensing device (E). This allows depositing the ceramic compound in a continuous layer (C) on the deposit plane (50).

Figure 1:
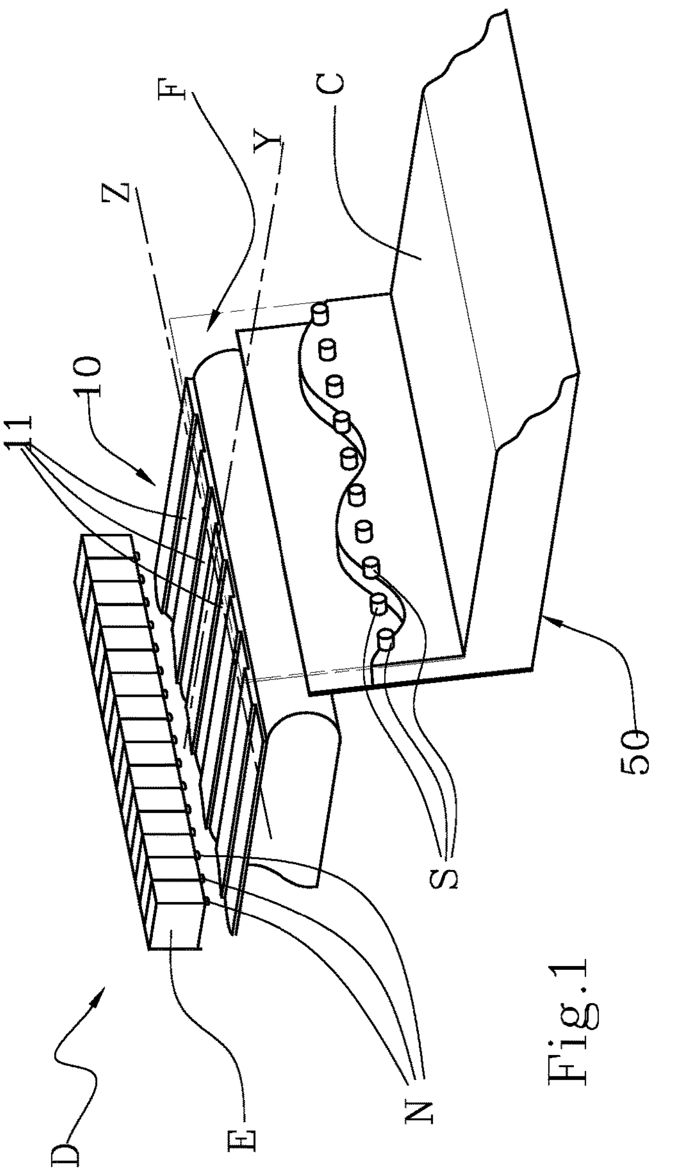
FIG. 1 shows a schematic isometric view of a part of the machine according to the present invention.

The relative motion between the deposit plane (50) and the distributor unit (D) can be obtained, for example, by sliding the deposit plane (50) along the longitudinal direction (Y), while the distributor unit (D) is static with respect to the longitudinal direction (Y). In the embodiment shown, the intermediate element (10), while sliding along the path thereof around the rollers (31, 32), is overall static along the direction (Y). The sliding of the deposit plane (50) can be in the same direction or in the opposite direction with respect to the sliding of the upper section of the intermediate element (10) in the movement thereof around the rollers (31, 32). Preferably, but not necessarily, the deposit plane (50) is in the form of a belt or mat slidably movable along a closed path defined by two or more rollers, as shown in FIG. 1.

The relative movement between the deposit plane (50) and the distributor unit (D) involves the deposit of the ceramic material in a continuous layer (C). By regulating the relative speed between the deposit plane (50) and the distributor unit (D), it is possible to regulate the height or thickness of the layer which is formed on the deposit plane (50). In the embodiment shown, such a variation can be obtained by varying the sliding speed of the deposit plane (50) and/or the sliding speed of the intermediate element (10).

In a possible embodiment of the machine, the control module is arranged to control each dispensing device (E), and each nozzle (N), so as to fill the cavities (11) in relation to the decoration (V) which is to be made in the layer (C). To this end, the control module is equipped with an algorithm which allows to process an image of the decoration (V) to break it down into a series of volumes of powdered material, of predetermined colour, each of which is attributed to a predetermined cavity (11). The control module then regulates the operation of the dispensing device (E) so that each volume is introduced into a predetermined cavity (11). The correspondence between each volume and a respective cavity is established by making known to the control module the position of each cavity (11), the speed of the intermediate element (10) and the speed of the deposit plane (50), for example by means of an encoder, sensors or optical systems known in the art. In essence, starting from the decoration (V) which is to be made, the control module defines the number and the position of the volumes of the material necessary to obtain it, and attributes each volume to a cavity (11), in relation to the position in which the volume contained in the cavity (11) will be unloaded on the deposit plane (50).

In order to improve the deposit of the material on the deposit plane (50), preserving the decoration distributed in the cavities (11) by means of the dispensing device (E), it is preferable to minimise the distance between the upper section of the intermediate element (10) and the deposit plane (50). For example, the distance between the upper section of the intermediate element (10) and the deposit plane (50) can be reduced by arranging a first roller (31) of reduced diameter.

In the embodiment shown, in which the distributor unit (D) comprises the intermediate element (10), the container (F) is situated near the first roller (31), i.e., near the area in which the unloading of the cavities (11) occurs.

A first wall (33*a*) is situated near the first roller (31), i.e., near the area in which the unloading of the cavities (11) occurs. The first wall (33*a*) is arranged and shaped so as to intercept the material which is unloaded from the cavities (11), to guide or switch the trajectory thereof inside the collection space (33*c*). The second wall (33*b*) is situated upstream of the first wall (33*a*) with respect to the advancement direction of the cavities (11). The second wall (33*b*) is placed so as not to interfere with the material which is projected forwards by the cavities (11), but rather to contain the material, intercepted by the first wall (33*a*), which falls downwards. To this end, the second wall (33*b*) has an upper edge positioned at a lower height with respect to the trajectory followed by the material unloaded from the cavities (11). For example, the upper edge of the second wall (33*b*) is situated below the horizontal diametrical plane of the first roller (31).

The invention claimed is:

1. A machine for dry decoration of ceramic slabs or tiles, comprising:

- a deposit plane (50);
- a distributor unit (D), configured to dispense, in a controlled manner, a ceramic compound in granular or powdered form;
- a storage container (F), interposed between the distributor unit (D) and the deposit plane (50) to store a certain amount of ceramic compound dispensed by the distributor unit (D), and comprising an unloading opening (O) configured to allow the deposit of the ceramic compound on the deposit plane (50);
- wherein the storage container (F) and the deposit plane (50) are in relative movement with respect to one another along a longitudinal direction (Y);
- a control module, connected to the distributor unit (D) and configured to control and regulate the dispensing of ceramic compound by the distributor unit (D);
- one or more sensors (S), connected to the control module and configured to detect a significant parameter of the amount of ceramic compound contained in the storage container (F) and to process a corresponding measurement signal;
- wherein the control module is configured to regulate the dispensing of ceramic compound as a function of the measurement signal received, so as to maintain a desired amount of ceramic compound inside the container (F), wherein the distributor unit (D) comprises a dispensing device (E) equipped with a plurality of dispensing nozzles (N), each of which is provided with a shutter device, which are configured to be activated between a flow configuration, in which the dispensing of a ceramic material is determined, and a stop configuration;

wherein each shutter device is controlled by the control module independently of the other shutters;

wherein the distributor unit (D) comprises an intermediate deposit element (10), provided with a plurality of cavities (11), positioned above the deposit plane (50) and below the dispensing device (20);

wherein each cavity (11) has an opening which allows the entry of the powdered material and a subsequent unloading of the powdered material previously introduced;

wherein the distributor unit (D) comprises an unloading device (30), configured to move the cavities (11) from a loading position, in which they can receive the powdered material from each dispensing device (E) to an unloading position, in which they can unload the powdered material downwards;

wherein the plurality of dispensing nozzles (N) are aligned to form a bar arranged parallel to a transverse direction (Z) that is perpendicular or inclined with respect to the longitudinal direction (Y);

wherein each shutter device is configured to be activated between the flow and stop configurations due to a pneumatic command;

wherein the control module is configured to regulate the pneumatic command to each shutter device; and wherein the measurement signal produced by each sensor (S) is used to command a number of respective dispensing nozzles (N) that are substantially aligned with said sensor (S) within two vertical planes that are parallel to the longitudinal direction (Y) and separated by a predetermined distance.

2. The machine according to claim 1, wherein the intermediate element (10) comprises a flexible belt; the unloading device (30) comprises a pair of rollers (31,32) around which the intermediate element (10) is wound, so as to define a closed-loop path; the cavities (11) face the exterior of such a closed path.

3. The machine according to claim 1, wherein the control module is configured to regulate an activation time cycle in the flow and stop configurations for each shutter device.

4. The machine according to claim 1, wherein at least one sensor (S) is configured to measure a level reached by the ceramic compound inside the storage container (F).

5. The machine according to claim 1, wherein at least one sensor (S) is configured to measure the weight of at least a part of the ceramic compound inside the storage container (F).

6. The machine according to claim 1, wherein each dispensing nozzle (N) comprises: a dispensing channel (2*a*), provided with a longitudinal axis (X), an inlet opening (21) and an outlet opening (22); wherein the shutter devices comprise suction means, configured to retain, on command, at least a part of granular or powdered material inside the dispensing channel (2*a*), so as to form an accumulation which obstructs the dispensing channel (2*a*) and prevents the flow of material.

7. The machine according to claim 6, wherein each dispensing nozzle (N) comprises one or more suction openings (23), formed through a wall of the dispensing channel (2*a*) and placed in communication with the suction means.

8. The machine according to claim 7, wherein each dispensing nozzle (N) comprises a filter (A), interposed between each suction opening (23) and the dispensing channel (2*a*).

9. The machine according to claim 1, wherein each dispensing nozzle (N) comprises a dispensing channel (20) provided with an inlet opening (21) and an outlet opening (22), in which:

the dispensing channel (20) comprises an intermediate portion (23), which connects the inlet (21) and outlet (22) openings and is provided with a longitudinal axis (Y); the intermediate portion (23) has a length (L) and a height (H), measured on a vertical plane containing the longitudinal axis (Y), wherein the height (H) is measured perpendicular to the length (L);

the intermediate portion (23) is configured to enable the deposit and accumulation of a predetermined quantity of granular material coming from the inlet opening (21);

wherein the shutter devices comprise a motor means which can be activated on command to cause the granular material to flow in advancement from the intermediate portion (23) towards the outlet opening (22).

10. The machine according to claim 9, wherein the motor means comprises a pneumatic means (24,25,26), provided with a blowing opening (24) located along the intermediate portion (23).

11. The machine according to claim 10, wherein the pneumatic means (24,25,26) comprises a dispensing device (26), connected to the blowing opening (24), which is provided with a control means that can be activated on command to send an air flow to the blowing opening (24).

12. The machine according to claim 6, wherein the plurality of dispensing nozzles (N) are arranged side by side along the transverse direction (Z), with the outlet openings (22) side by side and facing in the same direction, so as to define a deposit front of predetermined length.

13. The machine according to claim 1, wherein at least one sensor of the one or more sensors is placed on a front wall of the storage container.

14. The machine according to claim 1, wherein the one or more sensors are arranged side by side along the transverse direction at substantially the same height and are spaced apart from each other by a predetermined pitch.

* * * * *